(12) United States Patent
Tsumiyama

(10) Patent No.: US 7,650,813 B2
(45) Date of Patent: Jan. 26, 2010

(54) POSITION CONTROL MECHANISM FOR BICYCLE CONTROL DEVICE

(75) Inventor: Akira Tsumiyama, Osaka (JP)

(73) Assignee: Shimano Inc., Osaka (JP)

( * ) Notice: Subject to any disclaimer, the term of this patent is extended or adjusted under 35 U.S.C. 154(b) by 877 days.

(21) Appl. No.: 11/132,431

(22) Filed: May 19, 2005

(65) Prior Publication Data

US 2006/0260427 A1    Nov. 23, 2006

(51) Int. Cl.
     *F16C 1/10*      (2006.01)

(52) U.S. Cl. ............... 74/502.2; 74/473.14; 74/473.33; 192/217

(58) Field of Classification Search ............. 74/501.6, 74/502.2, 488, 489, 473.13, 473.14, 500.5, 74/473.3, 473.33; 192/217; B62M 25/04

See application file for complete search history.

(56) References Cited

U.S. PATENT DOCUMENTS

| | | | |
|---|---|---|---|
| 5,241,878 A | 9/1993 | Nagano | |
| 5,257,683 A | 11/1993 | Romano | |
| 5,400,675 A | 3/1995 | Nagano | |
| 6,073,730 A | 6/2000 | Abe | |
| 6,216,078 B1 | 4/2001 | Jinbo et al. | |
| 6,502,477 B1 | 1/2003 | Assel | |
| 6,647,823 B2 | 11/2003 | Tsumiyama et al. | |
| 7,124,873 B2 * | 10/2006 | Tsumiyama | 192/217 |
| 2004/0005947 A1 | 1/2004 | Shahana et al. | |
| 2006/0272443 A1* | 12/2006 | Tsumiyama | 74/502.2 |
| 2009/0090209 A1* | 4/2009 | Hara et al. | 74/489 |

FOREIGN PATENT DOCUMENTS

EP      1 728 714 A2 * 12/2006

* cited by examiner

*Primary Examiner*—Vinh T. Luong
(74) *Attorney, Agent, or Firm*—Global IP Counselors, LLP

(57) ABSTRACT

A position control mechanism is provided for a bicycle control device that has a shifting unit. The position control mechanism has an operating member that is configured to operate a positioning member that moves through two of a plurality of predetermined shift positions during a single progressive movement of the operating member. The operating member is configured in the preferred embodiment to operate both a hydraulic braking unit and the shifting unit.

17 Claims, 13 Drawing Sheets

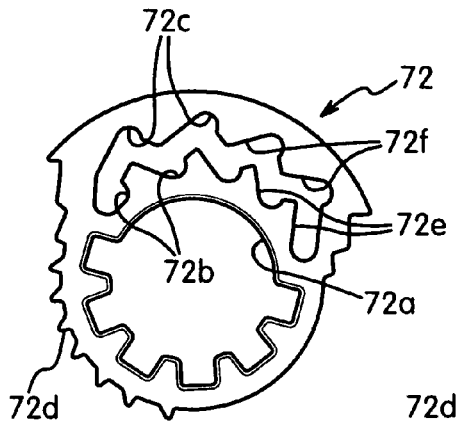
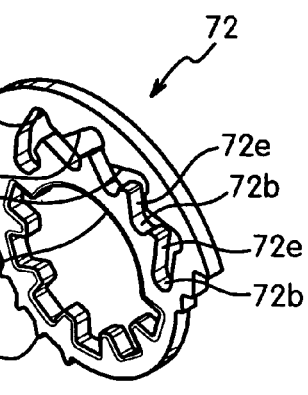
Fig. 22   Fig. 23   Fig. 24
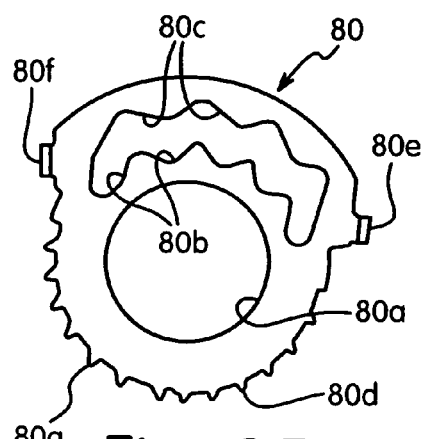
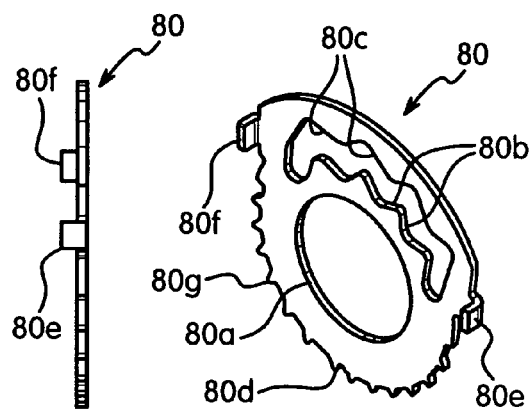
Fig. 25   Fig. 26   Fig. 27
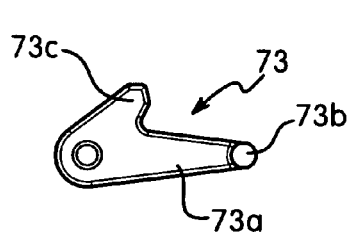
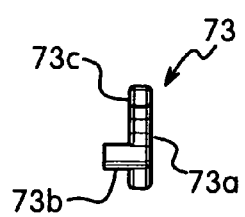
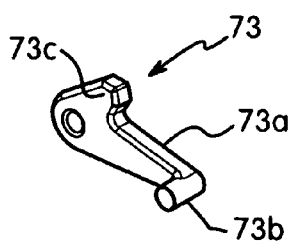
Fig. 28   Fig. 29   Fig. 30

POSITION CONTROL MECHANISM FOR BICYCLE CONTROL DEVICE

BACKGROUND OF THE INVENTION

1. Field of the Invention

This invention generally relates to a bicycle control device. More specifically, the present invention relates to a position control mechanism for controlling the movement of a bicycle control device such as a shifter.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

Generally, when riding a bicycle, it is desirable to be able to operate the brake control mechanism and the shift control mechanism of the bicycle quickly and easily while maintaining a firm grasp on the handlebar. Some bicycles have brake levers that are separate from and the shifting devices such as disclosed in U.S. Patent Application Publication No. US2004/0005947 (assigned to Shimano, Inc.). However, other bicycle control devices have been developed the combine both the braking and shifting functions into a single unit. Examples of such control devices of this type are disclosed in the following U.S. Pat. Nos. 4,241,878; 5,257,683; 5,400, 675; and 6,073,730; and 6,216,078. For effecting braking and speed change, some of these known control devices have a brake lever that also acts as a shift lever that winds a wire takeup element and a release lever located behind a brake/shift lever. While other known control devices have a shift lever that winds a wire takeup element located behind a brake lever and a release lever that is located laterally of the brake lever. Thus, the rider can carry out braking and speed change operations without the rider changing from one lever to another. One example of a bicycle control device with a single brake/shift lever is disclosed in U.S. Patent Application Publication No. US2002/0139637 (assigned to Shimano, Inc.).

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

One object of the present invention is to provide a position control mechanism for a bicycle control device that provides a relatively simple release arrangement.

Another object of the present invention is to provide a position control mechanism for a bicycle control device with a positioning member that moves through two of a plurality of predetermined shift positions during a single progressive movement of the release member.

Another object of the present invention is to provide a position control mechanism for a bicycle control device in which a single lever can be used for upshifting and downshifting.

Another object of the present invention is to provide a position control mechanism for a bicycle control device in which a single lever can be used for shifting and braking.

Another object of the present invention is to provide a bicycle control device that is relatively inexpensive to manufacture.

In accordance with one aspect of the present invention, the foregoing objects can basically be attained by providing a position control mechanism for a bicycle control device that comprises a positioning member, a position maintaining member and a releasing member. The positioning member is configured and arranged to rotate about a rotational axis between one of a plurality of predetermined shift positions. The position maintaining member is configured and arranged to selectively move between a first engagement position that holds the positioning member in one of the predetermined shift positions and a second engagement position that holds the positioning member in another of the predetermined shift positions which is different from the first engagement position. The releasing member is operatively coupled to the position maintaining member to move the position maintaining member between the first and second engagement positions.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 22 is a side elevational view of the positioning plate of the shift position control mechanism for the bicycle control device illustrated in FIGS. 2-8;

FIG. 23 is an edge elevational view of the positioning plate illustrated in FIG. 22 of the shift position control mechanism for the bicycle control device illustrated in FIGS. 2-8;

FIG. 24 is a perspective view of the positioning plate illustrated in FIGS. 22 and 23 of the shift position control mechanism for the bicycle control device illustrated in FIGS. 2-8;

FIG. 25 is a side elevational view of the cam releasing plate of the shift position control mechanism for the bicycle control device illustrated in FIGS. 2-8;

FIG. 26 is an edge elevational view of the cam releasing plate illustrated in FIG. 25 of the shift position control mechanism for the bicycle control device illustrated in FIGS. 2-8;

FIG. 27 is a perspective view of the cam releasing plate illustrated in FIGS. 25 and 26 of the shift position control mechanism for the bicycle control device illustrated in FIGS. 2-8;

FIG. 28 is a side elevational view of the detent member of the shift position control mechanism for the bicycle control device illustrated in FIGS. 2-8;

FIG. 29 is an edge elevational view of the detent member illustrated in FIG. 28 of the shift position control mechanism for the bicycle control device illustrated in FIGS. 2-8; and FIG. 30 is a perspective view of the detent member illustrated in FIGS. 28 and 29 of the shift position control mechanism for the bicycle control device illustrated in FIGS. 2-8.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
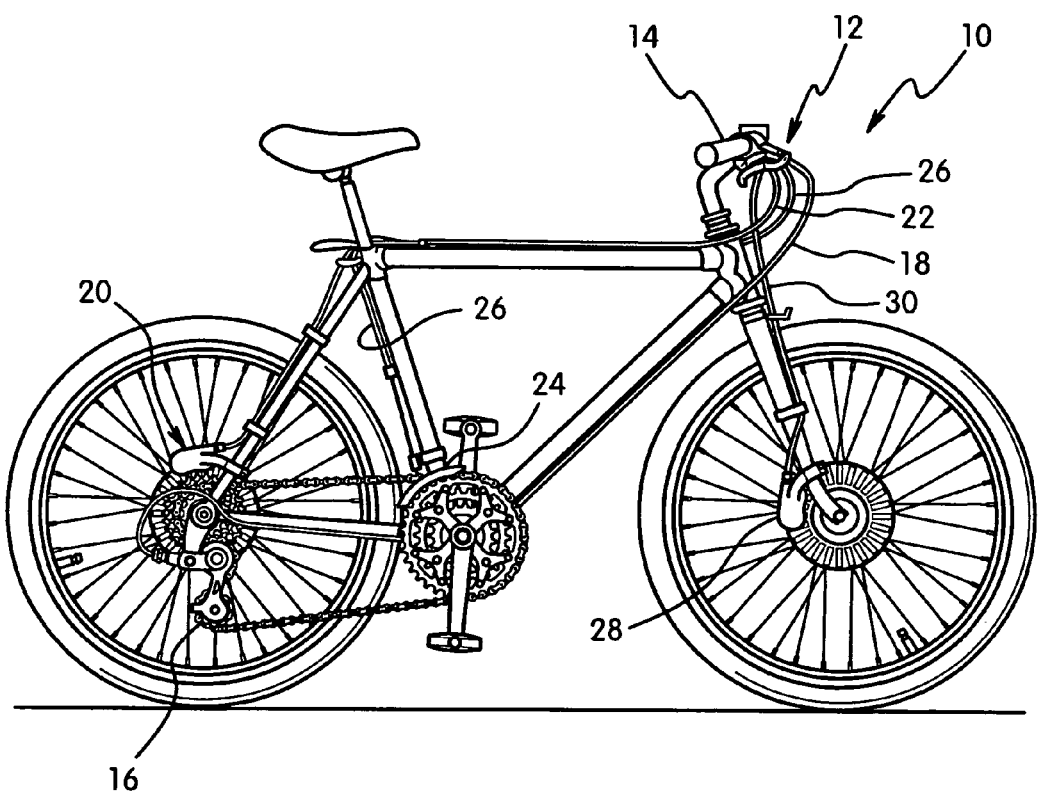
FIG. 1 is a side elevational view of a bicycle equipped with a pair of control devices (only one shown) in accordance with one embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18 and to a rear hydraulic brake device 20 via a rear hydraulic brake hose 22. This bicycle control device 12 is preferably a combined shift and brake control device that is configured and arranged to perform both a shifting operation and braking operation with a single lever as explained below. Alternatively, the bicycle control device 12 can be connected a front hydraulic brake device 28 via a hydraulic brake hose 30, if needed and/or desired.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 24 via a shift control cable 26 and the front brake device 28 via the brake hose 30. Alternatively, if the hydraulic brake hose 30 connects the bicycle control device 12 to the front brake device 28 in an alternate embodiment, then the left hand side bicycle control device would be operatively coupled to the rear brake device 20 via the rear hydraulic brake hose 22. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

As used herein to describe the bicycle control device 12, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the bicycle control device 12 of the present invention.

Referring now to FIGS. 2-8, the bicycle control device 12 basically includes a bicycle handlebar mounting portion 31, a braking unit 32 and a shifting unit 33. In this embodiment, the braking unit 32 and the shifting unit 33 are integrated into the mounting portion 31. Preferably, the mounting portion 31 is constructed of a hard light weight rigid material such as a light weight metal.

The mounting portion 31 has a clamping section 31*a*, a reservoir section 31*b*, a tubular shaft section 31*c* and a positioning control mounting section 31*d*. The clamping section 31*a* is preferably a split bore type of clamping arrangement in which the diameter of the bore is varied by a fixing bolt in a conventional manner. The clamping section 31*a* is relatively conventional in construction thus will not be discussed or illustrated in further detail herein. The tubular shaft section 31*c* primarily supports the braking unit 32 and the shifting unit 33. The free end of the tubular shaft section 31*c* of the mounting portion 31 has external threads for securing the braking unit 32 and the shifting unit 33 to the mounting portion 31 by a nut 34.

Figure 3:
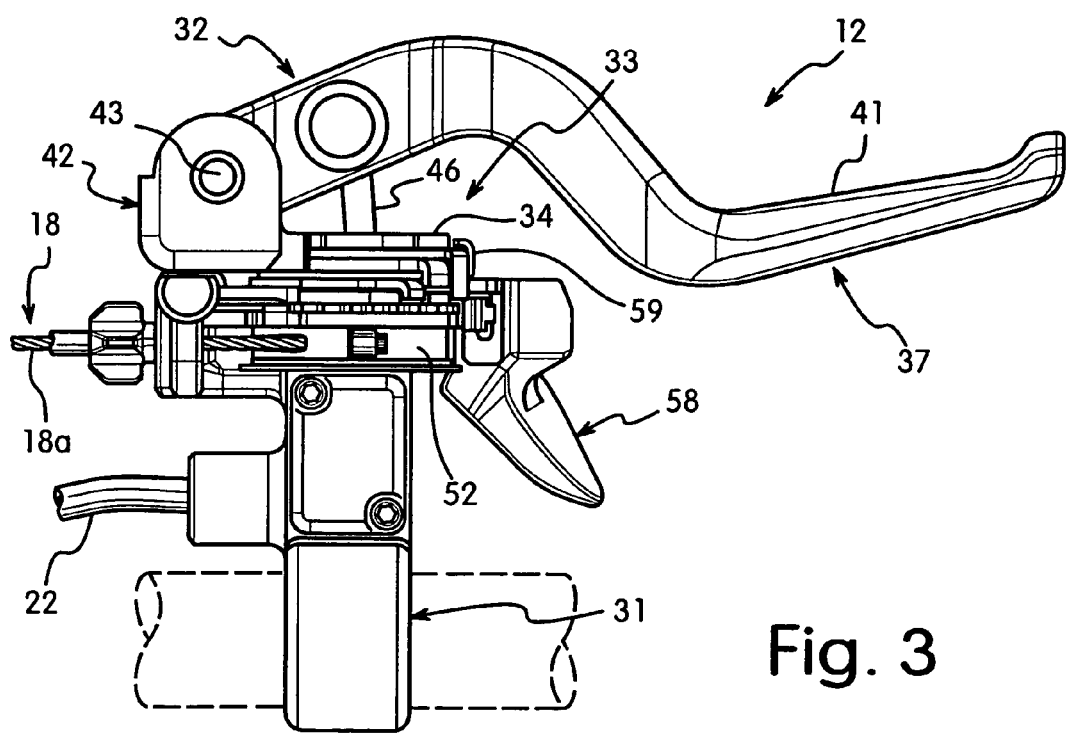
FIG. 3 is a top plan view of the bicycle control device illustrated in FIGS. 1 and 2 in accordance with one embodiment of the present invention.
Figure 4:
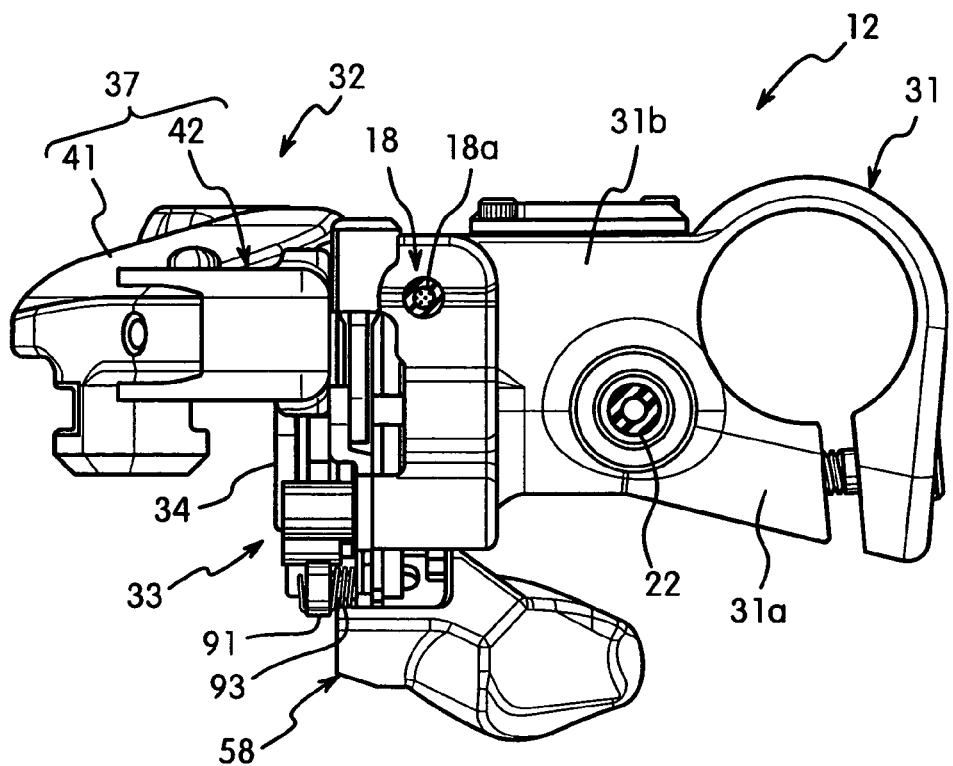
FIG. 4 is an inner side elevational view of the bicycle control device illustrated in FIGS. 1-3 in accordance with one embodiment of the present invention.
Figure 5:
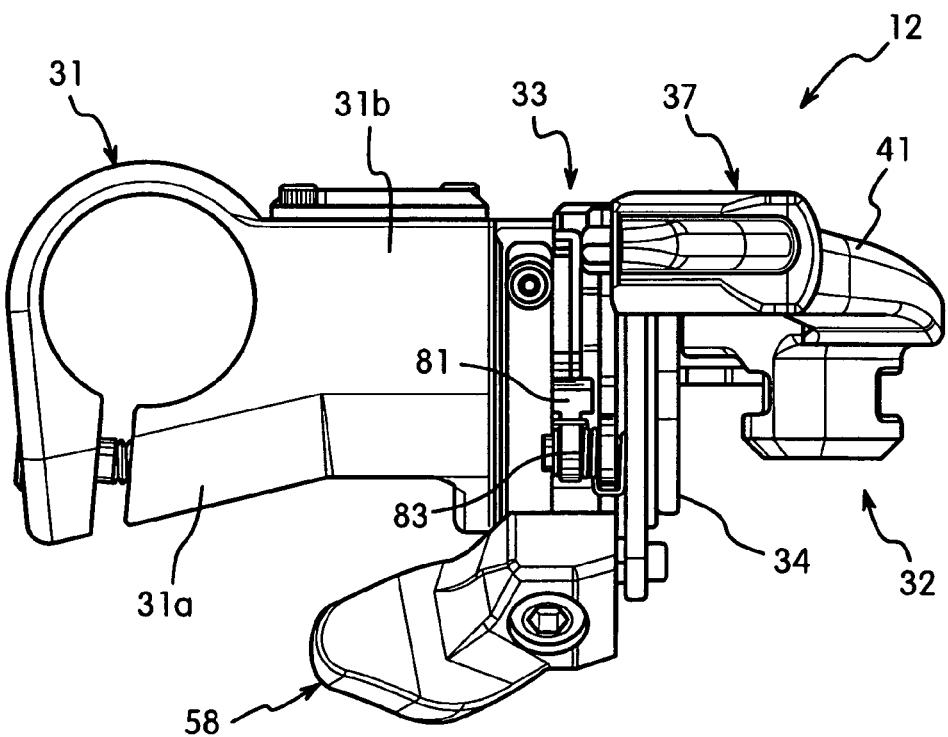
FIG. 5 is an outer side elevational view of the bicycle control device illustrated in FIGS. 1-4 in accordance with one embodiment of the present invention.
Figure 6:
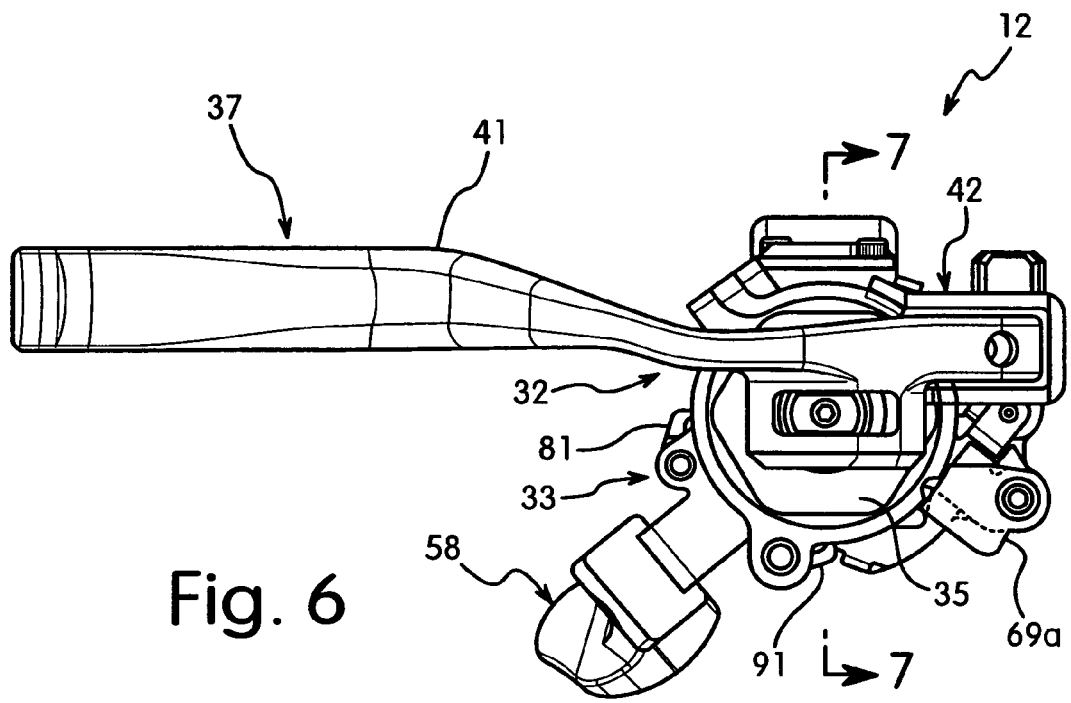
FIG. 6 is a front side elevational view of the bicycle control device illustrated in FIGS. 1-5 in accordance with one embodiment of the present invention.
Figure 7:
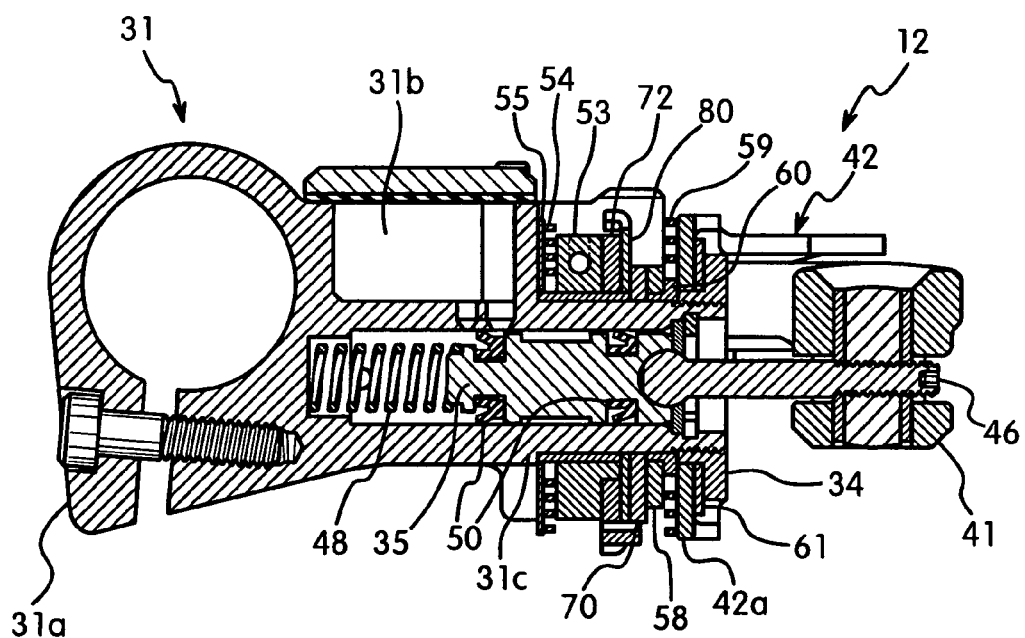
FIG. 7 is an enlarged cross sectional view of the bicycle control device as viewed along section line 7-7 of FIG. 6.

As best seen in FIG. 7, the braking unit 32 basically includes a hydraulic reservoir (formed by the reservoir section 31*b* of the mounting portion 31), a master cylinder (formed by the tubular shaft section 31*c* of the mounting portion 31), and a piston 35. The braking unit 32 is selectively operated by a main operating member 37. This main operating member 37 also selectively operates the shifting unit 33. Thus, the braking unit 32 is a dual function operating member that functions as both a brake operating member and a main shift operating member. The main operating member 37 is configured and arranged to perform a braking operation when moved towards the handlebar 14 along a braking path or plane as seen in FIG. 3. Also, main operating member 37 is configured and arranged to perform a shifting operation when moved along a shifting path or plane as seen in FIG. 6 that is perpendicularly arranged relative to the braking path or plane as seen in FIG. 3.

The reservoir contains hydraulic fluid (mineral oil) which is pressurized by movement of the piston 35 in the master cylinder in response to the pivotal movement of the main operating lever 41 towards the handlebar 14 along a braking path or plane. The pressurized hydraulic fluid then operates the rear brake device 20 in a conventional manner. Preferably, the rear brake device 20 is a conventional hydraulic disc brake. The parts of the rear brake device 20 are relatively conventional, thus these parts and their operations will not be discussed or illustrated in detail herein. Likewise, preferably, the front brake device 28 is a conventional hydraulic disc brake, which will not be discussed or illustrated in detail herein. Alternatively, cable operated brake devices can be used to carry out certain aspects of the present invention by changing the braking unit 32 to a cable operated structure.

Preferably, the master cylinder and the reservoir are integrally formed with the mounting portion 31 as a one piece, unitary main support as illustrated herein. The master cylinder and the reservoir are in fluid communication with each other for supplying pressurized fluid to the rear brake device 20 to perform a braking operation in a conventional manner in response to operation of the main operating member 37.

The main operating member 37 is attached to the master cylinder (the tubular shaft section 31*c*) to rotate about the center cylinder axis of the master cylinder when a shifting operation is being performed. Preferably, the main operating member 37 includes the main operating lever 41 and an attachment member or ring 42. The main operating lever 41 is pivotally mounted to the attachment member 42 by a pivot pin 43 such that the main operating lever 41 move along a braking path that is defined by a braking plane extending in a direction perpendicular to the pivot axis of the pivot pin 43. The pivot pin 43 is arranged such that the pivot axis of the pivot pin 43 extends in a direction perpendicular to the center cylinder axis of the master cylinder (the tubular shaft section 31*c*). The attachment member or ring 42 is mounted on the exterior surface of the master cylinder (the tubular shaft section 31*c*). The attachment member or ring 42 is configured to rotate about the center cylinder axis of the master cylinder (the tubular shaft section 31*c*) along a shifting path that is defined by a shifting plane extending in a direction perpendicular to the braking plane of the braking path. Thus, the main operating lever 41 is used as both a braking lever and a shifting lever.

Figure 8:
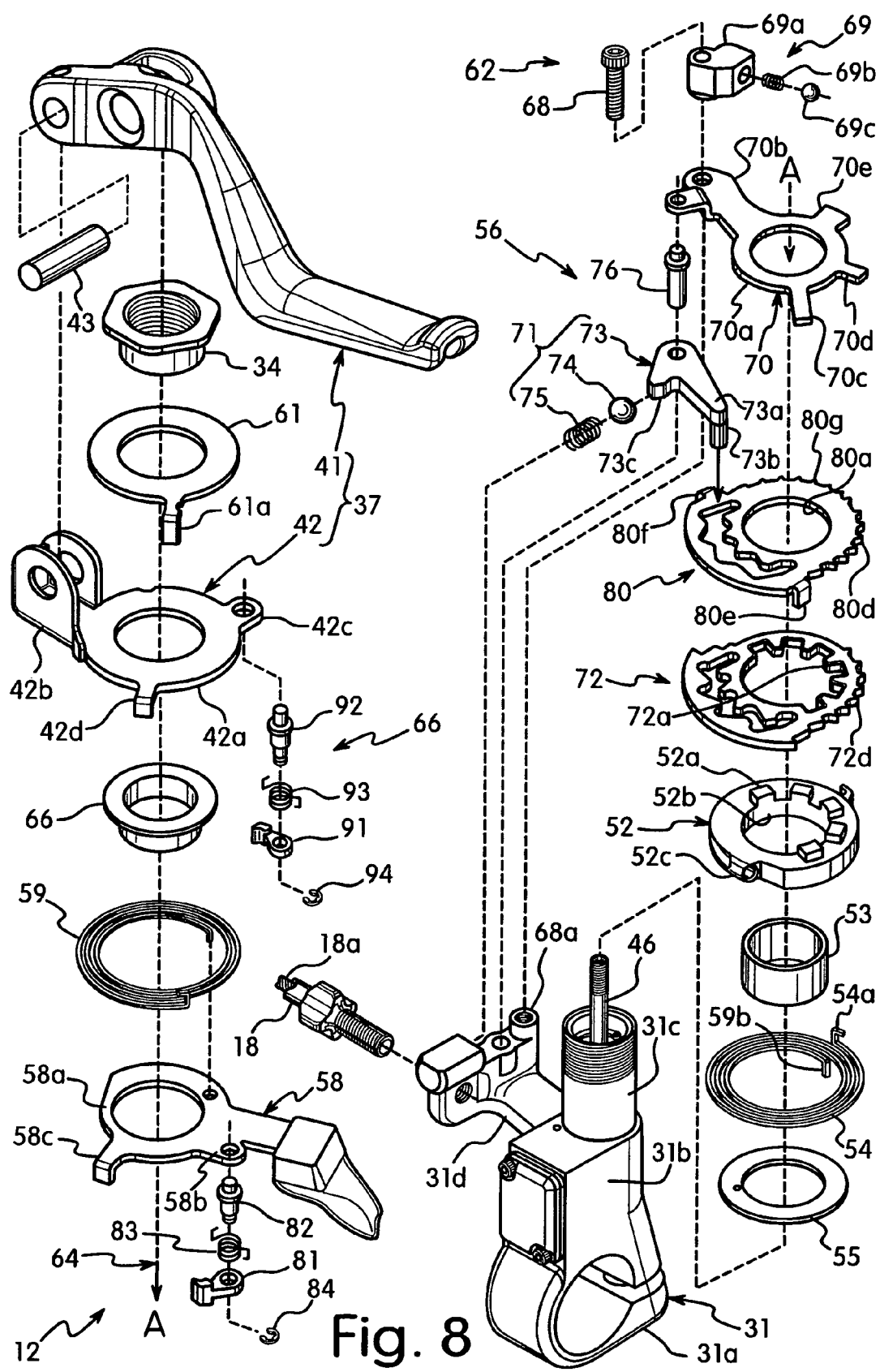
FIG. 8 is an exploded perspective view of the bicycle control device illustrated in FIGS. 1-7 in accordance with one embodiment of the present invention.
Figure 9:
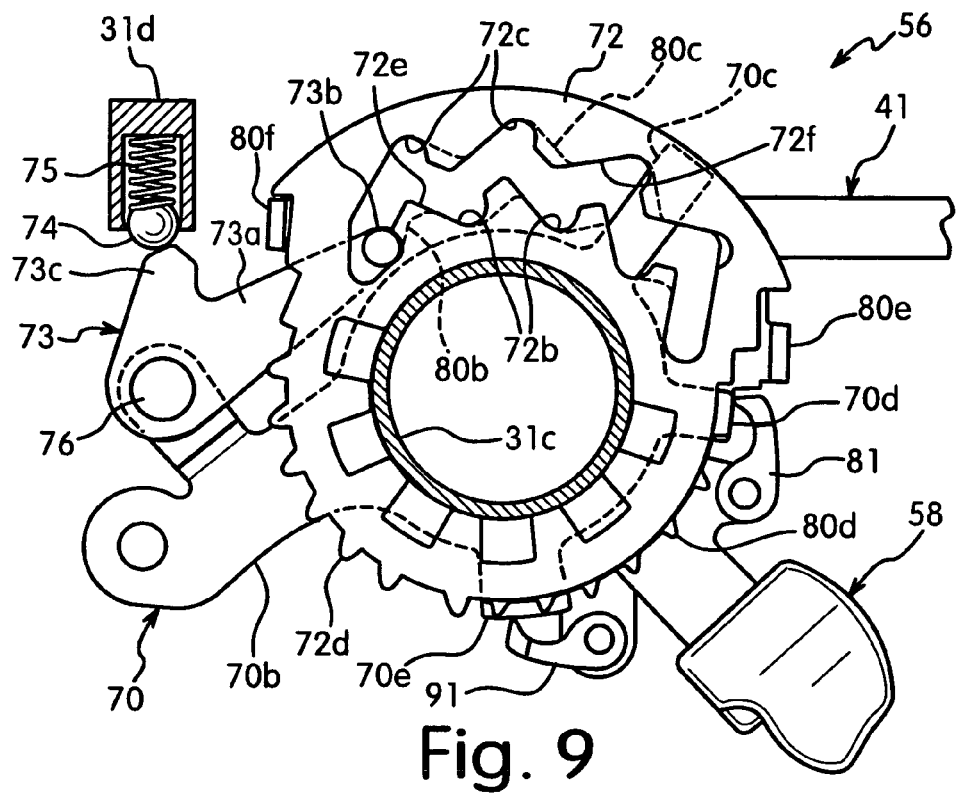
FIG. 9 is a simplified rear side elevational view of the shift position control mechanism for the bicycle control device illustrated in FIGS. 1-8 with the selected parts removed to show the main operating lever, the secondary operating (release) lever, the positioning plate and the cam releasing plate in their normal rest positions and the detent or position maintaining member in a first engagement position, with the inner wire of the rear shift cable fully retracted on the wire takeup member.
Figure 10:
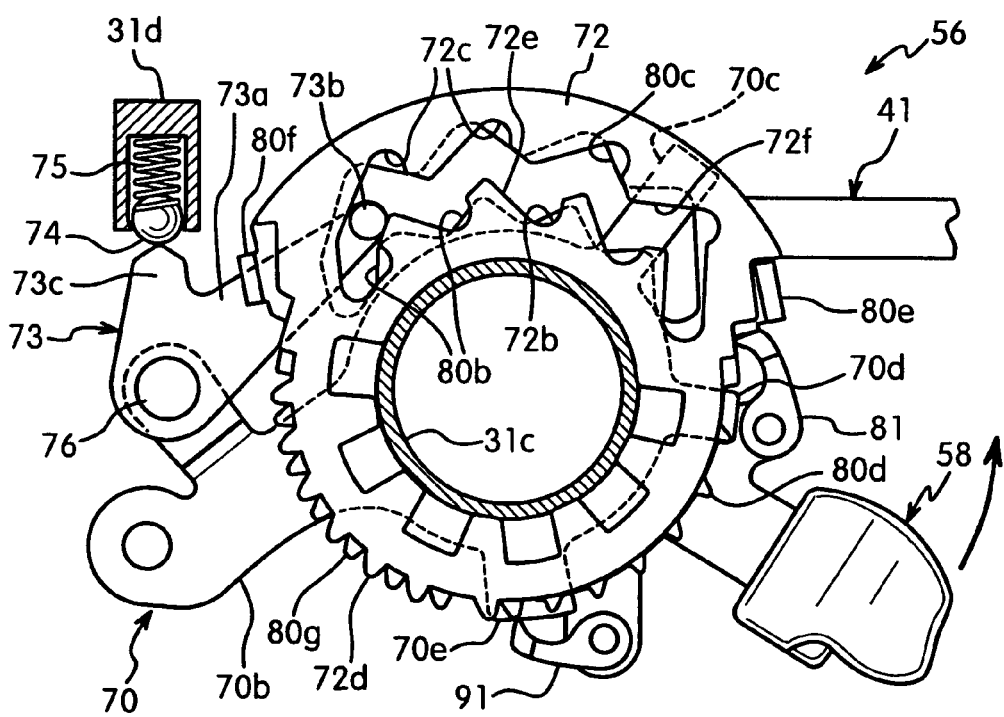
FIG. 10 is a simplified rear side elevational view of the shift position control mechanism for the bicycle control device, similar to FIG. 9, but with the secondary (release) lever being moved in a shift wire releasing direction such that the cam releasing plate is moved by the release pawl to move the detent member to a release position.

Referring now to FIGS. 2, 3, 6 and 8, the main operating member 37 and its attachment to the mounting portion 31 will now be discussed. The main operating member 37 is mounted in a rotatable manner to the tubular shaft section 31*c* of the mounting portion 31 by the attachment member 42. As best seen in FIG. 8, the attachment member 42 has a rotating ring section 42*a*, a lever mounting section 42*b*, a pawl mounting flange 42*c*, and a stop flange 42*d*. Basically, the rotating ring section 42*a* is mounted around the tubular shaft section 31*c* of the mounting portion 31 (the master cylinder) and secured thereto by the nut 34. Thus, the attachment member 42 can be rotated around the center cylinder axis of the master cylinder (the tubular shaft section 31*c*) by applying a generally upward force or a generally downward force to the free end of the main operating lever 41.

Figure 2:
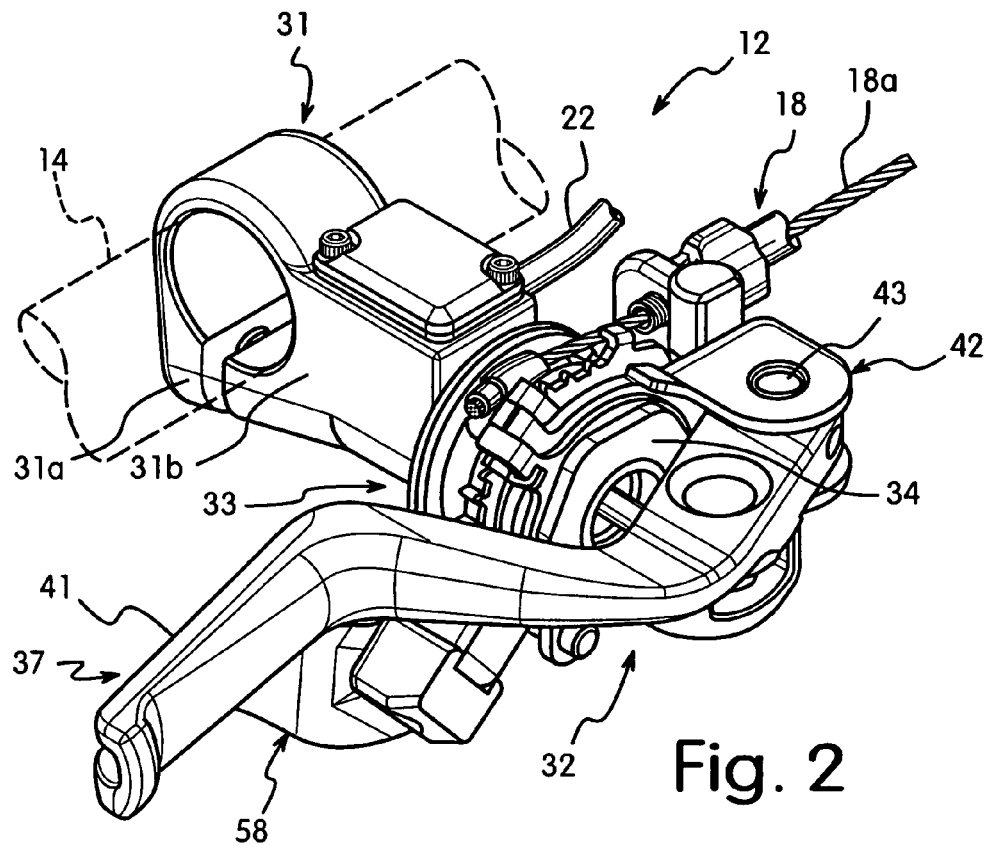
FIG. 2 is an enlarged perspective view of the bicycle control device illustrated in FIG. 1 in accordance with one embodiment of the present invention.

As best seen in FIGS. 2, 3 and 7, the main operating member 37 further includes a connecting rod 46 that is connected between intermediate portion of the main operating lever 41 and the piston 35. Thus, when the main operating lever 41 is moved along the braking path or plane that is arranged perpendicular to the pivot axis of the pivot pin 43, the piston 35 is moved within the master cylinder (the tubular shaft section 31*c*) to perform a braking operation.

In particular, as best seen in FIG. 7, the piston 35 is slidably located in the cylinder (the tubular shaft section 31*c*) to actuate the rear braking device 20 (FIG. 1). Preferably, the piston 35 is biased outwardly by a compression spring 48 that is disposed within the cylinder (the tubular shaft section 31c) and that contacts the inner end of the piston 35. Thus, the main operating lever 41 is normally biased to a non-braking position by the compression spring 48 that acts on the piston 35, which in turn act on the connecting rod 46 that is connected to the main operating lever 41. The piston 35 preferably includes a pair of annular sealing rings 50 such that the hydraulic fluid (mineral oil) is retained within the master cylinder (the tubular shaft section 31c) and the reservoir. The operation of the master cylinder and the piston 35 are relatively conventional, thus these parts and operations will not be discussed or illustrated in detail herein.

Now, the shifting unit 33 will be discussed. As best seen in FIGS. 2-8, the shifting unit 33 is basically mounted around the center cylinder axis of the master cylinder (the tubular shaft section 31c) to provide a compact structure. Moreover, with this arrangement, the main operating lever 41 also acts as a main shift lever of the shifting unit 33 as explained below. Thus, the shifting unit 33 basically includes the main operating member 37, discussed above, as well as a wire takeup member 52, a wire takeup biasing member or spring 54, a shift wire position control mechanism 56 and a secondary operating member or lever 58. This arrangement of the shifting unit 33 allows the rider to shift the rear gears up or down regardless of the rider's hand position on the handlebar 14. As explained below, the main operating lever 41 and the secondary operating lever 58 are operatively connected to the wire takeup member 52 by the shift wire position control mechanism 56 to selectively wind or release the inner wire 18a.

The main operating lever 41 is configured and arranged to act as both a winding lever and a release lever and a brake lever. The secondary operating lever 58 is configured and arranged to act solely as a release lever. Thus, the main operating lever 41 can be pivoted in a first direction to rotate the wire takeup member 52 in a winding direction and pivoted in a second direction to rotate the wire takeup member 52 in a release direction. Both the main operating lever 41 and the secondary operating lever 58 are configured as trigger type of levers that spring back to a rest position after being operated to the shift position.

The main operating lever 41 of the main operating member 37 is configured and arranged to move along the shifting path or plane about the shifting axis that is coincident with or parallel to the center axis of the cylinder (the tubular shaft section 31c) to perform a shifting operation. The main operating member 37 is configured and arranged to perform both upshifting and downshifting, e.g., pulling (winding) and releasing (unwinding). The secondary operating lever 58 is also configured and arranged to move along the shifting path or plane about the shifting axis that is coincident with or parallel to the center axis of the master cylinder (the tubular shaft section 31c) to perform a shifting operation. However, the secondary operating lever 58 is only configured to release the inner wire 18a.

The main operating lever 41 and the secondary operating lever 58 are maintained in their rest position by a lever returning arrangement that includes a biasing member 59, a spacer member or washer 60 and a pushing washer 61. The biasing member 59 is preferably a torsion spring with one end attached to a hole in the secondary operating lever 58 and the other end contacting a tab 61a of the pushing washer 61 which pushes attachment member 42 that is connected to the main operating lever 41. Accordingly, the main operating lever 41 is biased in an opposite rotational direction from the secondary operating lever 58. The spacer member or washer 60 is configured and arranged to maintain the proper axial spacing between the main operating lever 41 and the secondary operating lever 58 so that the biasing member 59 is not axially squeezed therebetween.

When either the main operating lever 41 or the secondary operating lever 58 is moved in a generally upward direction, a downshifting or an upshifting operation is performed depending on the configuration of the rear derailleur 16. When the main operating lever 41 is moved by the rider in a generally upward direction, the secondary operating lever 58 is moved therewith in a generally upward direction. However, the secondary operating lever 58 is moved by the rider in a generally upward direction, the main operating lever 41 remains stationary.

As seen in FIGS. 9-15, the wire unwinding operation is illustrated in which a downshifting or an upshifting operation is performed depending on the configuration of the rear derailleur 16. While FIGS. 9-15 illustrates the secondary operating lever 58 being operated, the same movements occur when the main operating lever 41 is moved in the same (wire unwinding) direction of the secondary operating lever 58 as seen in FIGS. 9-15. Thus, when either the rider pushes the main operating lever 41 or the secondary operating lever 58 generally in an upward direction, the inner wire 18a is released to unwind the inner wire 18a from the outer peripheral edge of the wire takeup member 52. This inner wire releasing movement of the inner wire 18a operates the rear derailleur 16 to move the chain in a lateral direction relative to the center plane of the bicycle 10, such that the chain moves from one gear or sprocket to the next gear or a sprocket. The secondary operating lever 58 includes a ring portion 58a, a pawl mounting tab 58b and a stop tab 58c.

On the other hand, as seen in FIGS. 16-19, the main operating lever 41 of the main operating member 37 is pushed generally in a downward direction to perform either a downshifting operation or an upshifting operation depending on the configuration of the derailleur being operated. When the rider pushes the main operating lever 41 generally in a downward direction, the inner wire 18a is pulled to wind the inner wire 18a on the outer peripheral edge of the wire takeup member 52. This inner wire pulling movement of the inner wire 18a operates the rear derailleur 16 to move the chain in a lateral direction relative to the center plane of the bicycle 10, such that the chain moves from one gear or sprocket to the next gear or sprocket.

As best seen in FIG. 8, the wire takeup member 52 is a one piece unitary member made from a hard, rigid plastic material. The wire takeup member 52 is basically a ring shaped member that is rotatably mounted around the master cylinder (the tubular shaft section 31c) such that the wire takeup member 52 has its center pivot axis coinciding with the center cylinder axis of the master cylinder (the tubular shaft section 31c). The wire takeup member 52 is preferably mounted on the tubular shaft section 31c of the mounting portion 31 with a tubular washer 53 disposed therebetween. The tubular washer 53 is configured and arranged to maintain the proper axial spacing between the wire takeup member 52, the wire takeup biasing member 54, the parts of the shift wire position control mechanism 56 and the secondary operating member or lever 58. In particular, tubular washer 53 has a first end that contacts a spring supporting ring 55, and a second end that contacts a portion of the shift wire position control mechanism 56 such that the parts can freely rotate on the tubular shaft section 31c of the mounting portion 31.

As best seen in FIG. 8, the wire takeup member 52 has a plurality of projections 52a that surround a center opening 52b and a cable attachment point 52c located on its peripheral surface. The inner wire 18a of the rear shift cable 18 is attached at one to the cable attachment point 52c and at the other end to the rear derailleur 16. Thus, the inner wire 18a is wound around the periphery of the wire takeup member 52 when the inner wire 18a is being pulled, as seen in FIGS. 8-13, to operate the rear derailleur 16.

As best seen in FIGS. 2, 3, 7 and 8, the wire takeup biasing member 54 is a coiled torsion spring that has one end 54a coupled to a hook of the wire takeup member 52 and a second end 54b located in a hole formed in the main support 38 that forms the housing of the reservoir. Thus, the wire takeup member 52 is biased in a first rotational direction about the rotational shift axis that is coincident with the center cylinder axis of the master cylinder (the tubular shaft section 31c). As viewed in FIGS. 9-19, the wire takeup biasing member 54 urges the wire takeup member 52 in a counter-clockwise about rotational shift axis, i.e. a shift wire unwinding direction. When the bicycle control device 12 is in the normal rest position, the wire takeup member 52 is preloaded to maintain the shift position.

Still referring to FIGS. 7 and 8, the shift position control mechanism 56 is mounted around the master cylinder (the tubular shaft section 31c) for controlling the position of the wire takeup member 52 and thus, controlling the shift position of the rear derailleur 16 by pulling and releasing the inner wire 18a of the rear shift cable 18. Preferably, the shift position control mechanism 56 includes a shift position maintaining mechanism 62, a shift position releasing mechanism 64 and a shift position winding mechanism 66. The shift position releasing mechanism 64 is operatively coupled to the shift position control mechanism 56 such that the wire takeup member 52 is rotated in the wire unwinding direction. The shift position winding mechanism 66 is operatively coupled to the shift position control mechanism 56 such that the wire takeup member 52 is rotated in the winding direction.

Preferably, as seen in FIG. 8, the shift position maintaining mechanism 62 basically includes a mounting bolt 68, a main operating lever maintaining structure 69, a mounting/control member or plate 70, a positioning detent structure 71 and a shift positioning member or plate 72.

The mounting bolt 68 is secured to the positioning control mounting section 31d of the mounting portion 31. In particular, the mounting bolt 68 is threaded into a hole 68a of the positioning control mounting section 31d of the mounting portion 31. The mounting bolt 68 secures the main operating lever maintaining structure 69, the mounting/control member or plate and the positioning detent structure 71 to the positioning control mounting section 31d of the mounting portion 31.

As seen in FIG. 8, the main operating lever maintaining structure 69 basically includes a block 69a, a compression spring 69b, and a lever engaging ball 69c. The compression spring 69b, and the position retaining ball 69c are disposed in a bore of the block 69a such that the position retaining ball 69c is biased against the peripheral edge of the rotating ring section 42a of the attachment member 42. Preferably, the peripheral edge of the rotating ring section 42a of the attachment member 42 has a notch that the position retaining ball 69c engages when the main operating lever 41 and the secondary operating lever 58 are both in their rest positions.

As best seen in FIG. 8, the mounting/control member or plate 70 basically includes a stationary ring section 70a, a mounting arm 70b, a release lever stop tab 70c, a release pawl disengagement tab 70d, and a winding pawl disengagement tab 70e. The stationary ring section 70a is mounted around the tubular shaft section 31c, while the mounting arm 70b is secured to the positioning control mounting section 31d by the mounting bolt 68. The mounting arm 70b of the mounting/control member or plate 70 also retains the positioning detent structure 71 on the positioning control mounting section 31d. One end of the biasing member 59 is located in a hole in the ring portion 58a such that the stop tab 58c is normally biased against the release lever stop tab 70c such that the secondary operating lever 58 is maintained in the rest position.

Figure 11:
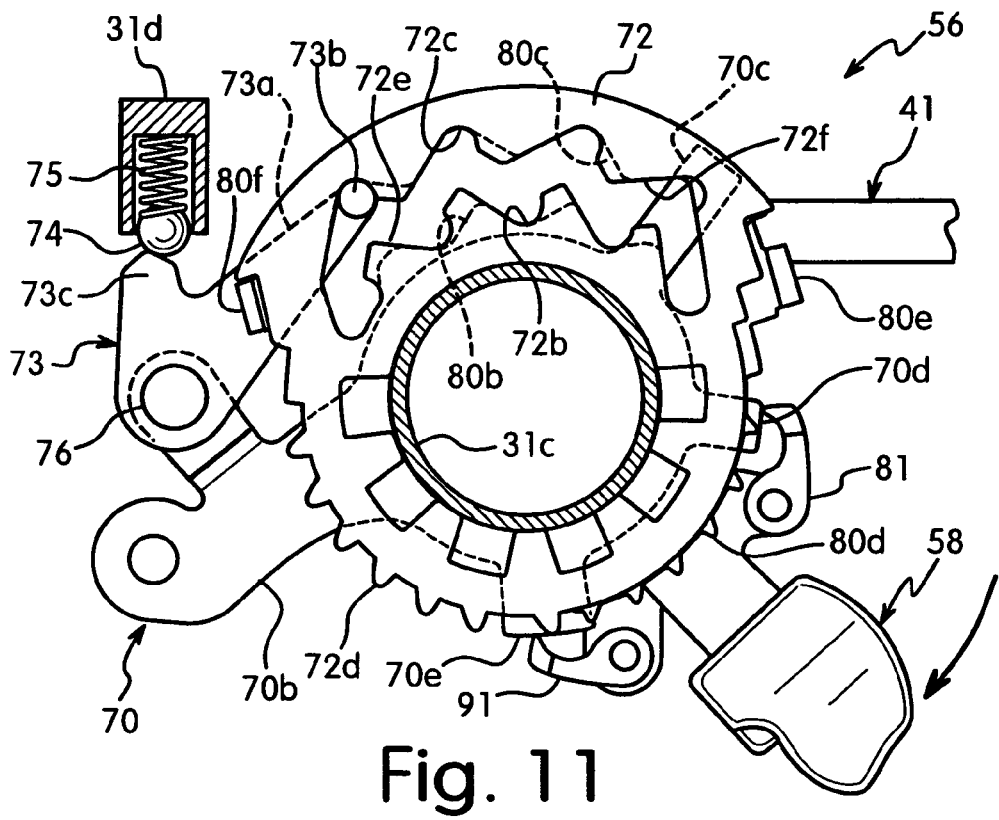
FIG. 11 is a simplified rear side elevational view of the shift position control mechanism for the bicycle control device, similar to FIGS. 9 and 10, but demonstrating the view after the secondary (release) lever has been moved in a shift wire releasing direction resulting in the positioning plate being moved to the next shift position in the wire unwinding direction and then returned to the rest position such that the detent or position maintaining member is in a second engagement position.
Figure 12:
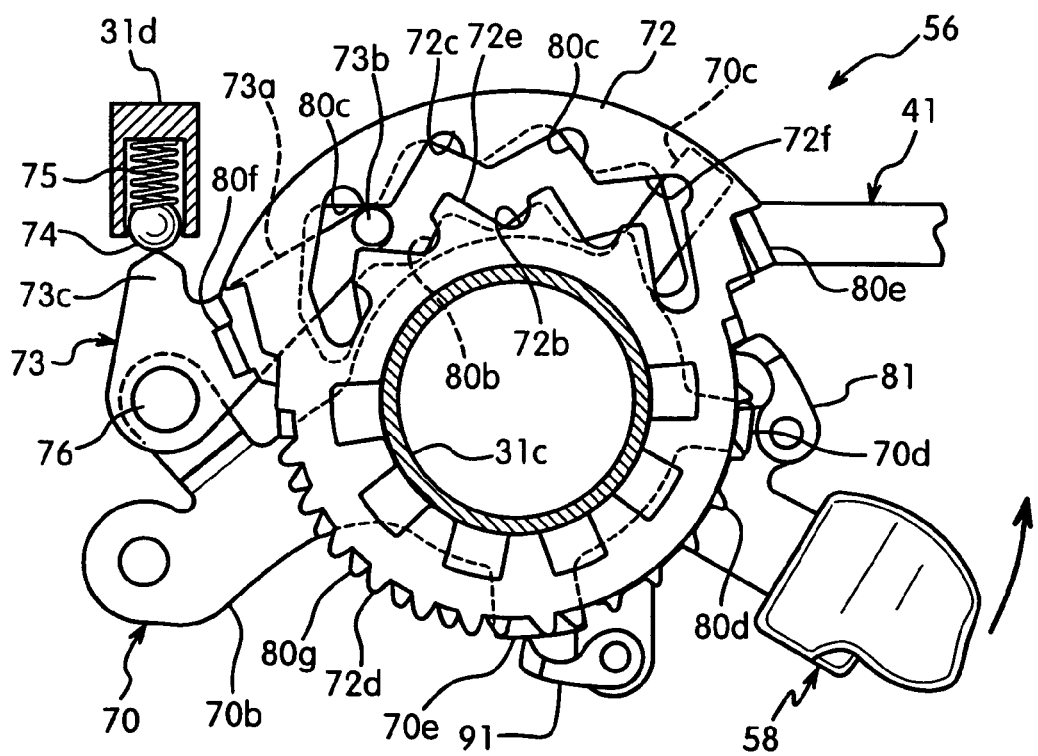
FIG. 12 is a simplified rear side elevational view of the shift position control mechanism for the bicycle control device, similar to FIGS. 9-11, but with the secondary (release) lever being moved in a shift wire releasing direction such that the cam releasing plate is moved by the release pawl to move the detent member to a release position.
Figure 13:
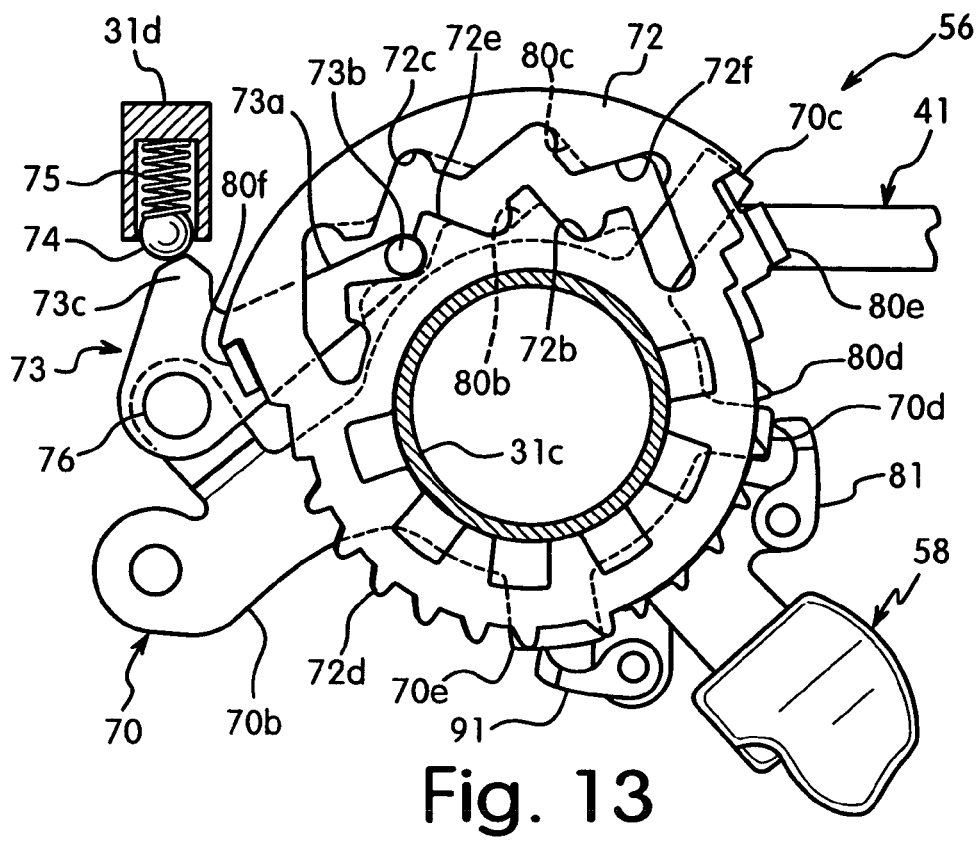
FIG. 13 is a simplified rear side elevational view of the shift position control mechanism for the bicycle control device, similar to FIGS. 9-12, but after the secondary (release) lever has been moved in a shift wire releasing direction resulting in the detent member being moved to the next shift position in the wire unwinding direction and then returned to the rest position.
Figure 14:
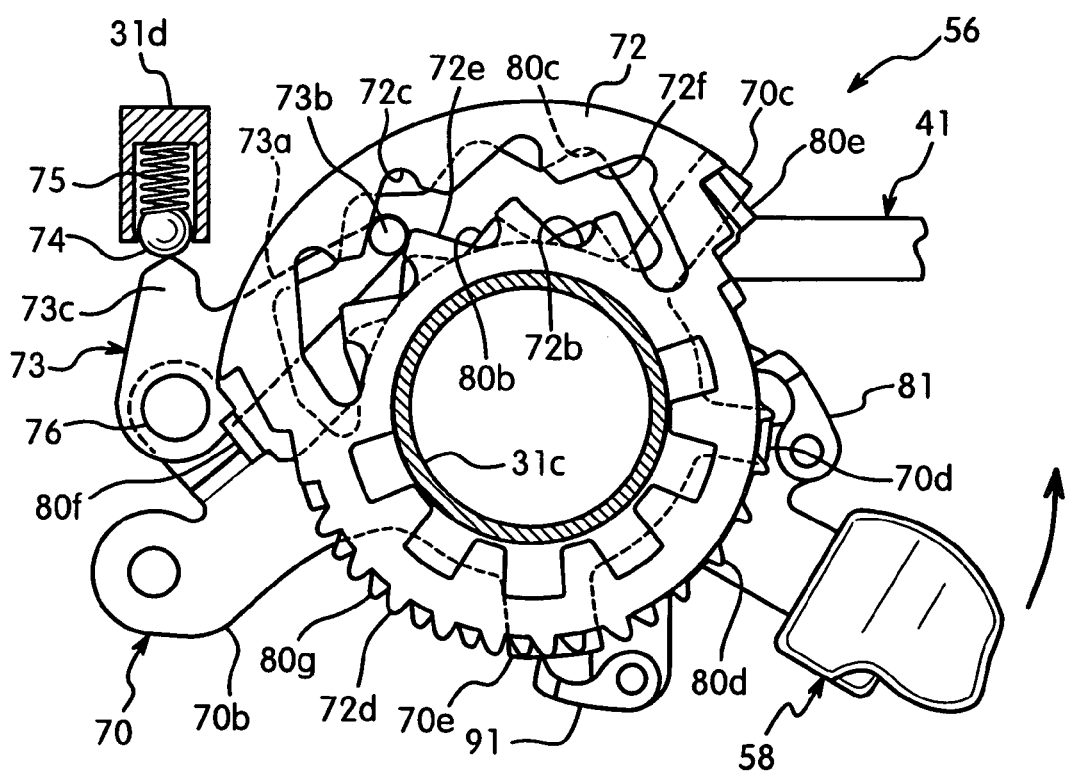
FIG. 14 is a simplified rear side elevational view of the shift position control mechanism for the bicycle control device, similar to FIG. 9-13, but with the secondary (release) lever being moved in a shift wire releasing direction such that the cam releasing plate is moved by the release pawl to move the detent member to a release position.
Figure 15:
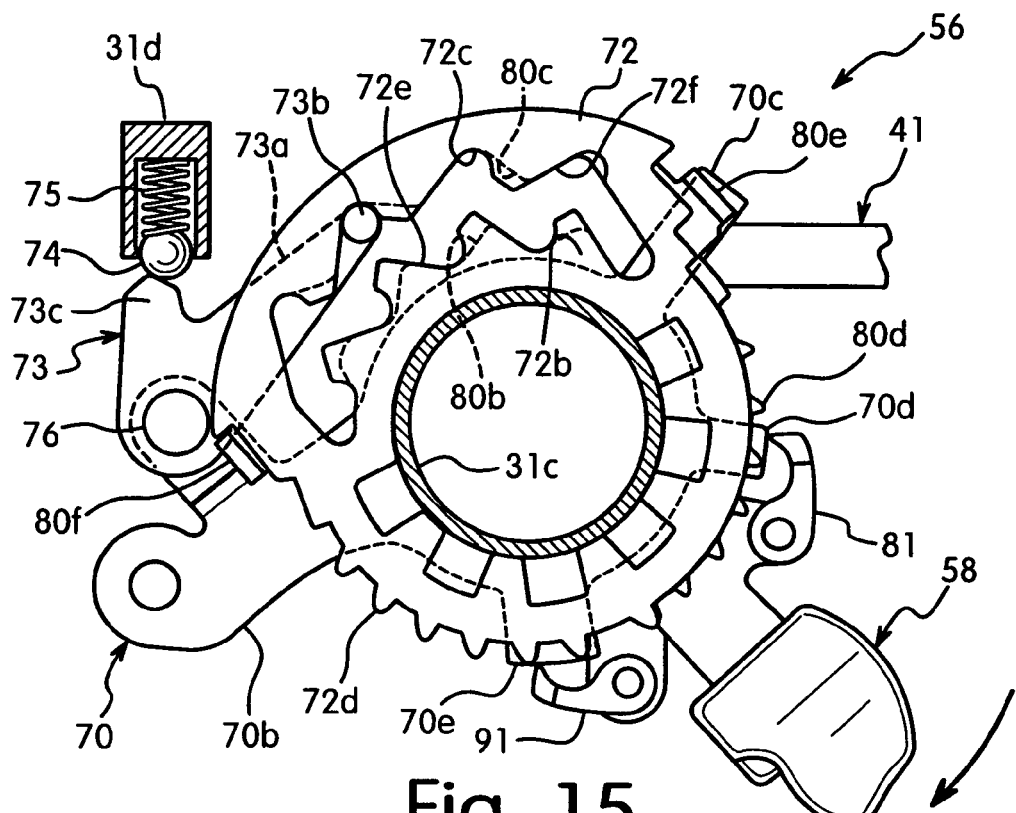
FIG. 15 is a simplified rear side elevational view of the shift position control mechanism for the bicycle control device, similar to FIGS. 9-14, but after the secondary (release) lever has been moved in a shift wire releasing direction resulting in the detent member being moved to the next shift position in the wire unwinding direction and then returned to the rest position.
Figure 16:
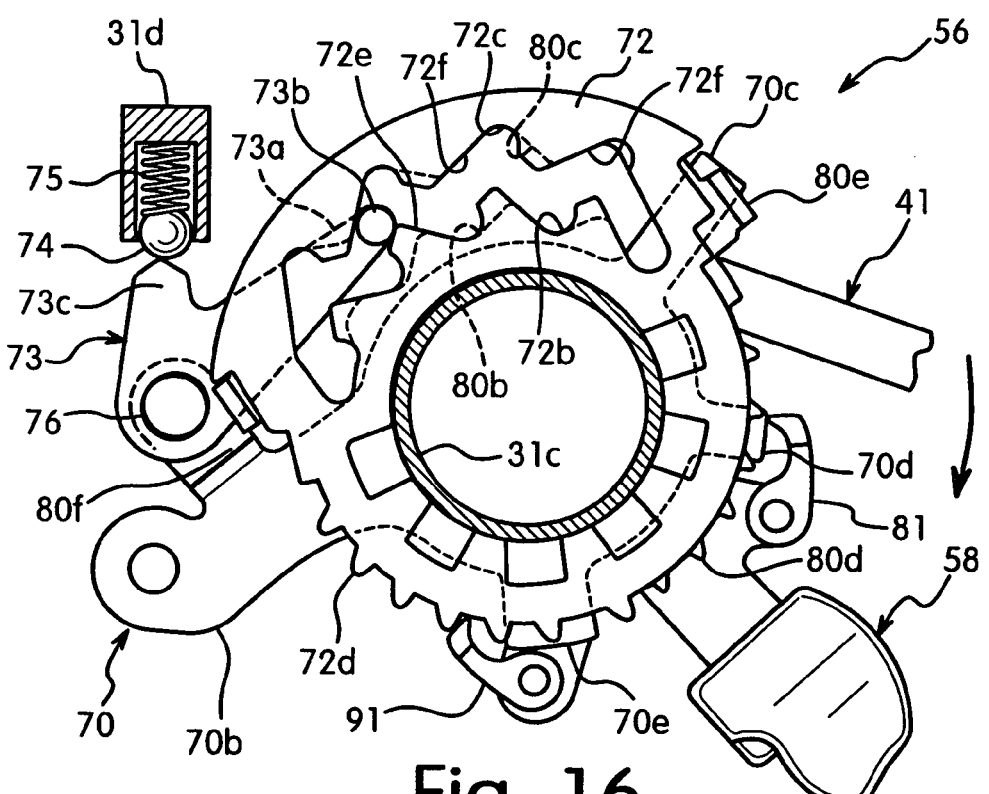
FIG. 16 is a simplified rear side elevational view of the shift position control mechanism for the bicycle control device, similar to FIGS. 9-15, but with the main operating lever being partially moved in a shift wire winding direction such that the positioning plate and the cam releasing plate are moved together by the positioning pawl to move the detent member to an intermediate position.
Figure 17:
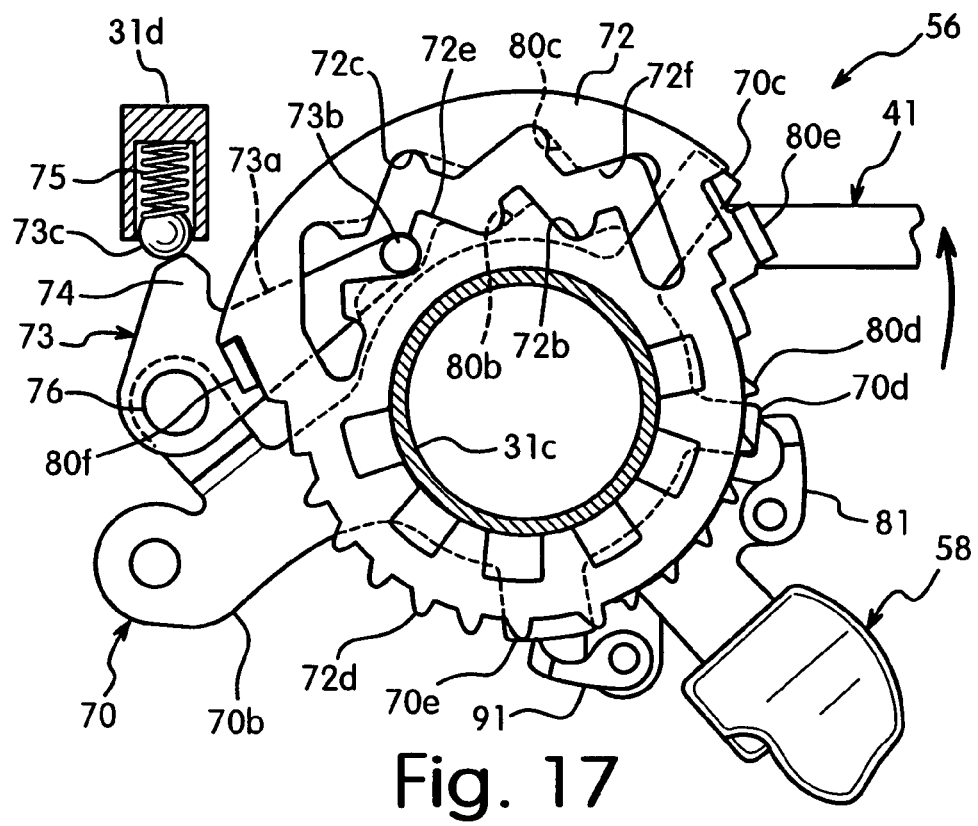
FIG. 17 is a simplified rear side elevational view of the shift position control mechanism for the bicycle control device, similar to FIGS. 9-16, but with the main operating lever being fully moved in a shift wire winding direction such that the positioning plate and the cam releasing plate are moved together by the positioning pawl to move the detent member to the next shift position.
Figure 18:
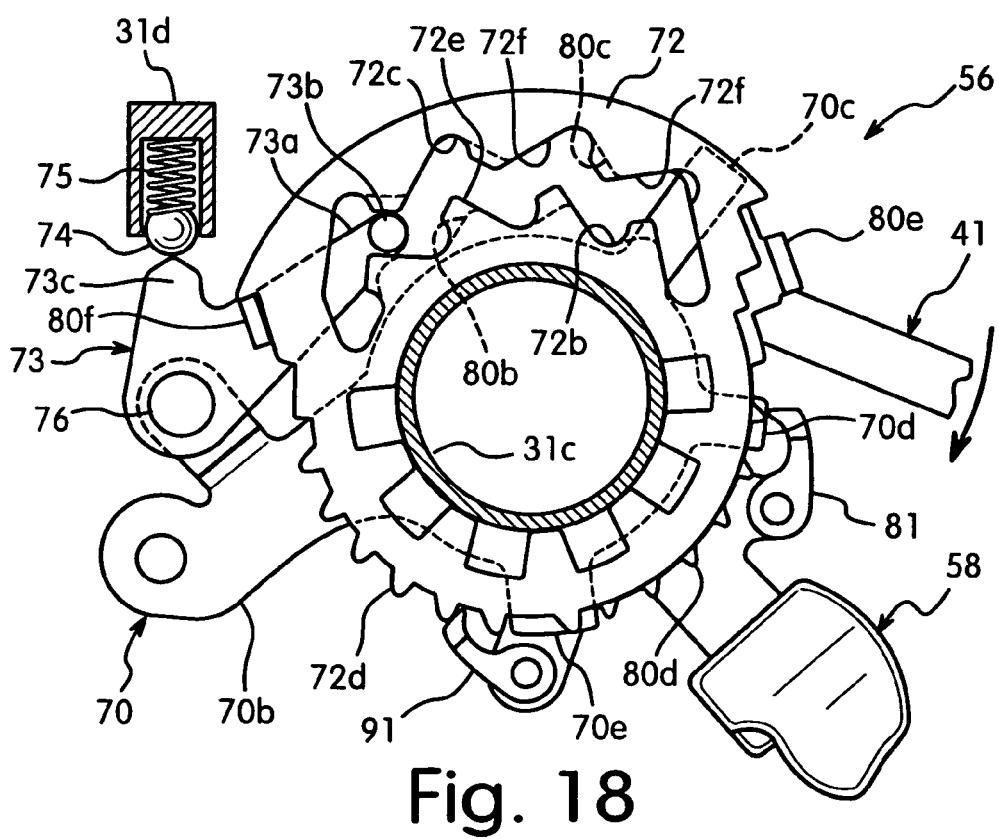
FIG. 18 is a simplified rear side elevational view of the shift position control mechanism for the bicycle control device, similar to FIGS. 9-17, but with the main operating lever being partially moved in a shift wire winding direction such that the positioning plate and the cam releasing plate are moved together by the positioning pawl to move the detent member to an intermediate position.
Figure 19:
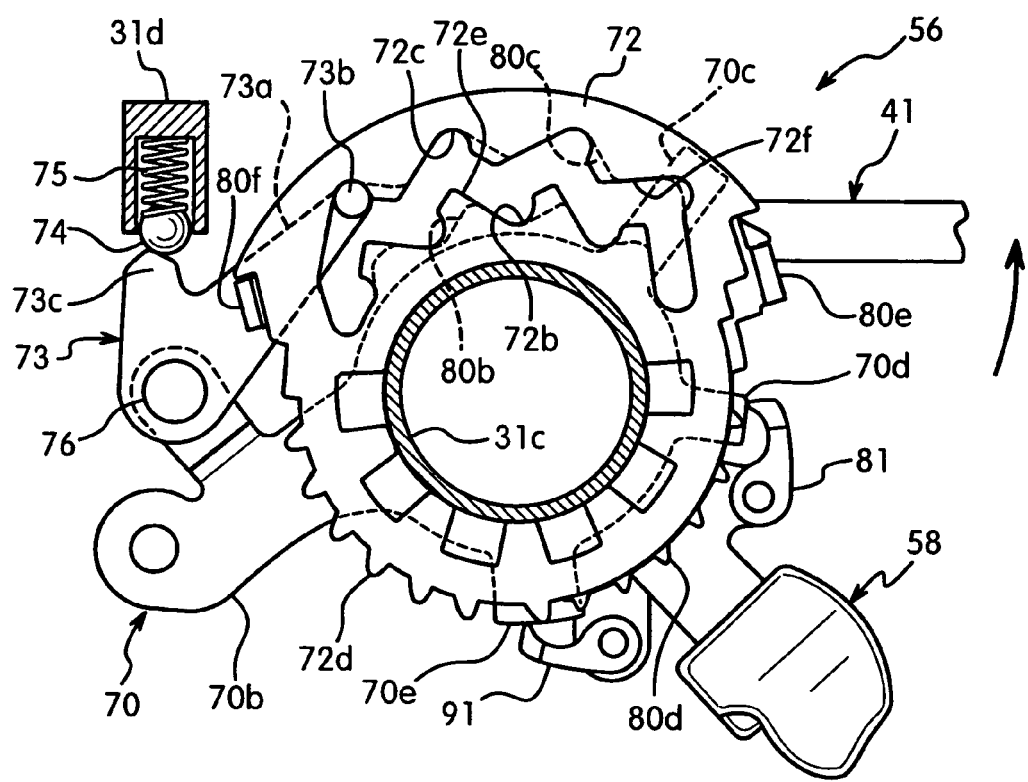
FIG. 19 is a simplified rear side elevational view of the shift position control mechanism for the bicycle control device, similar to FIGS. 9-18, but with the main operating lever being fully moved in a shift wire winding direction such that the positioning plate and the cam releasing plate are moved together by the positioning pawl to move the detent member to the next shift position.
Figure 20:
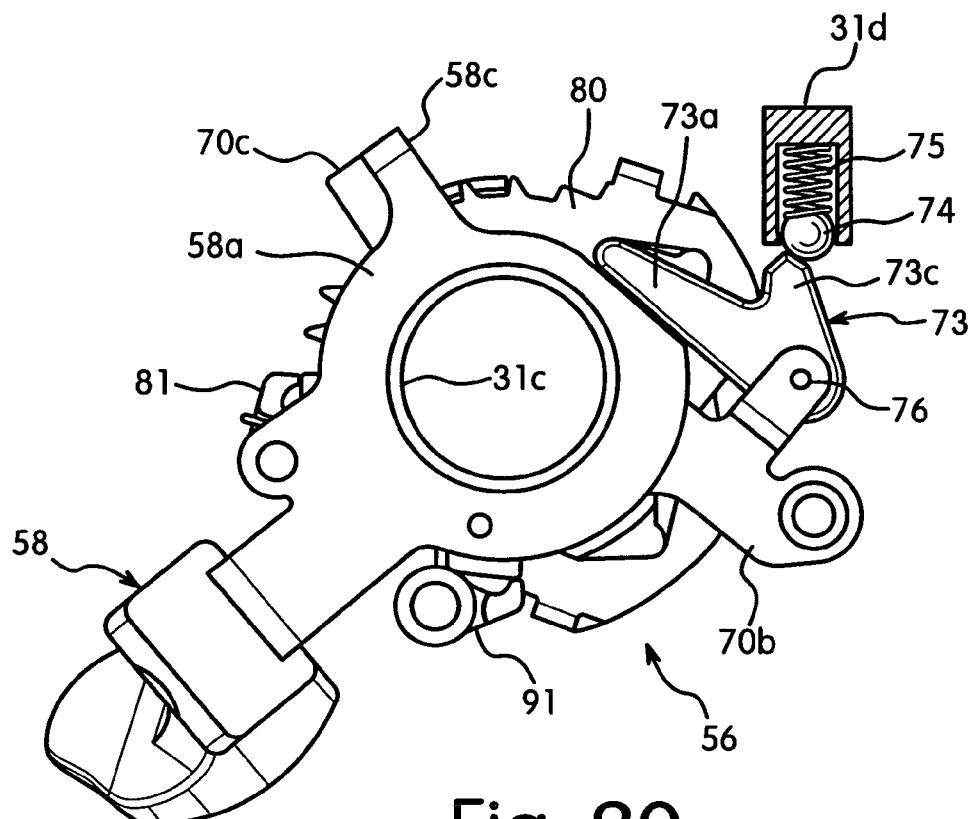
FIG. 20 is a simplified front side elevational view (opposite side from FIGS. 9-19) of the shift position control mechanism for the bicycle control device with the selected parts removed.
Figure 21:
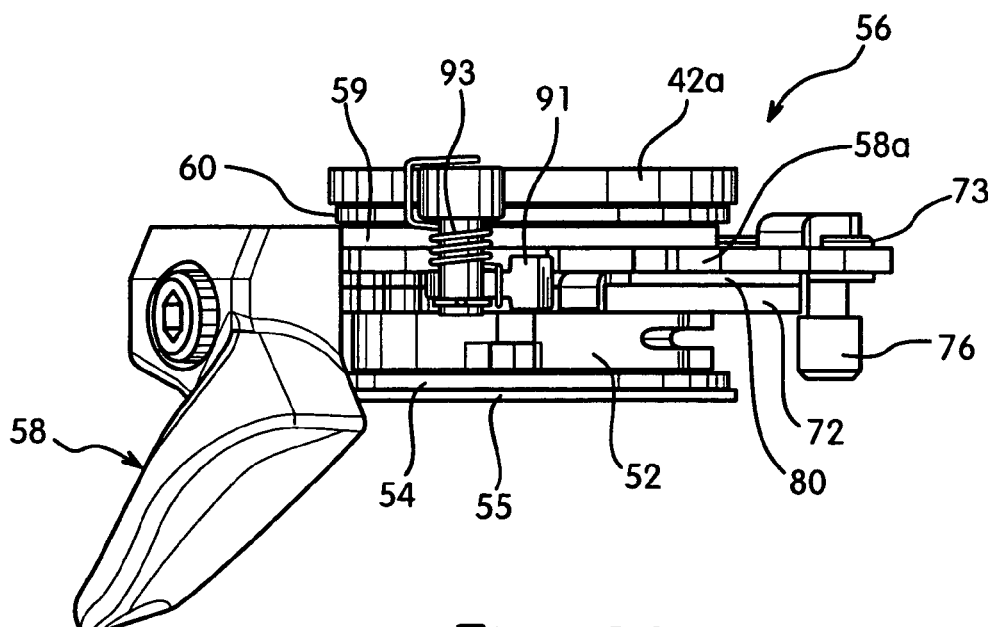
FIG. 21 is a simplified bottom plan view of the portions of the shift position control mechanism illustrated in FIG. 20.

Still referring to FIG. 8, the positioning detent structure 71 basically includes a positioning detent member 73, a position retaining ball 74 and a compression spring 75. The detent member 73, the position retaining ball 74 and the compression spring 75 are configured and arranged to form a toggle structure such that the detent member 73 is selectively retained in two distinct engagement positions, first and second engagement positions (e.g., see FIGS. 9 and 11), by the position retaining ball 74. Thus, the detent member 73 is a position maintaining member that is selectively biased in a first direction when in the first engagement position (FIG. 9) and biased in a second direction when in the second engagement position (FIG. 11).

The rotational movement of the shift positioning member or plate 72 causes the detent member 73 to rock (toggle) back and forth against the force of the compression spring 75 on the position retaining ball 74. As best seen in FIGS. 28-30, the detent member 73 includes a control arm 73a with a detent pin 73b and a cam arm 73c with a pair of cam surfaces. The detent member 73 is pivotally coupled to the positioning control mounting section 31d by a pivot pin 76 that is retained between the mounting/control member or plate 70 and the positioning control mounting section 31d. The detent member 73 is selectively retained in the two distinct positions (e.g., see FIGS. 9 and 11) by the position retaining ball 74 selectively engaging the cam surfaces at the free end of the cam arm 73c in response to the rotational movement of the shift positioning plate 72. In particular, the detent member 73 is pivoted by the rotational movement of the shift positioning plate 72, which is rotated by the shift position releasing mechanism 64 in the wire unwinding direction and the shift position winding mechanism 66 in the winding direction. This pivotal movement of the detent member 73 causes the cam arm 73c to move the position retaining ball 74 against the force of the compression spring 75. As the position retaining ball 74 switches from one of the cam surfaces at the free end of the cam arm 73c to the other of the cam surfaces of the cam arm 73c, the position retaining ball 74 biases the detent member 73 from one of the two distinct positions to the other of the two distinct positions (e.g., see FIGS. 9 and 11). Accordingly, the detent member 73 is toggled back and forth as the shift position control mechanism 56 from one shift position to the next shift position as seen in FIGS. 9-19.

As best seen in FIGS. 22-24, the shift positioning member or plate 72 basically includes a center opening 72a, a first toothed segment with a plurality of first (inner) recesses 72b defining a first set of the shift positions, a second toothed segment with a plurality of second (outer) recesses 72c defining a second set of the shift positions, and a set of winding ratchet teeth 72d. The first (inner) recesses 72b and the second (outer) recesses 72c constitute position retaining recesses. The shift positioning member or plate 72 also includes outwardly sloping guide ramps or surfaces 72e and inwardly sloping guide ramps or surfaces 72f that are angled towards each other in a zig-zag pattern. in other words, the guide ramps or surfaces 72e and 72f are arranged with one guide ramp being located adjacent one of the position retaining recesses 72b and 72c, respectively, to guide the detent pin 73b between adjacent ones of the position retaining recesses when the shift positioning plate 72 is rotated in the winding direction by operation of the main operating lever.

The center opening 72a is a non-circular opening that mates with the projections 52a of the wire takeup member 52 so that the wire takeup member 52 and the shift positioning plate 72 rotate together. In this embodiment, the first recesses 72b of the first toothed segment and the second recesses 72c of the second toothed segment are formed by a single detent retaining slot in the shift positioning plate 72. The second recesses 72c of the second toothed segment are spaced radially farther from the rotational axis than the first recesses 72b of the first toothed segment.

The shift position releasing mechanism 64 is operatively coupled to both the main operating lever 41 of the main operating member 37 and the secondary operating lever 58 such that either the main operating lever 41 or the secondary operating lever 58 can be used to perform a shift operation. In particular, the secondary operating lever 58 is configured and arranged to operate independently of the main operating lever 41 during movement of the secondary operating lever 58. However, when the main operating lever 41 is moved in the wire unwinding direction, the main operating lever 41 and the secondary operating lever 58 rotate together.

FIGS. 9-15 illustrate the unwinding operation. While FIGS. 9-15 illustrate the secondary operating lever 58 being operated, the same movements occur when the main operating lever 41 is moved in the same (wire unwinding) direction as the secondary operating lever 58 as seen in FIGS. 9-15. Thus, when either the rider pushes the main operating lever 41 or the secondary operating lever 58 generally in an upward direction, the inner wire 18a is released to unwind the inner wire 18a from the outer peripheral edge of the wire takeup member 52. This inner wire releasing movement of the inner wire 18a operates the rear derailleur 16 to move the chain in a lateral direction relative to the center plane of the bicycle 10, such that the chain moves from one gear or sprocket to the next gear or a sprocket.

Preferably, the shift position releasing mechanism 64 basically includes a cam releasing member or plate 80, a position release pawl 81, a release pawl mounting pin 82, a release pawl biasing member 83 and a retaining clip 84. The position release pawl 81 is pivotally secured to the secondary operating lever 58 by the release pawl mounting pin 82 and the retaining clip 84. The release pawl biasing member 83 is a torsion spring that biases the position release pawl 81 to selectively engage the cam releasing plate 80.

As best seen in FIGS. 25-27, the cam releasing plate 80 basically includes a center opening 80a, a first cam segment with a plurality of force applying surfaces 80b defining a set of first detent moving cams, a second toothed segment with a plurality of second force applying surfaces 80c defining a set of second detent moving cams, and a set of unwinding ratchet teeth 80d. The cam releasing plate 80 also includes an unwinding tab 80e, a winding tab 80f and a set of winding ratchet teeth 80g.

In this embodiment, the first force applying surfaces 80b of the first cam segment and the second force applying surfaces 80c of the second cam segment are formed by a single slot in the cam releasing plate 80. The second force applying surfaces 80c of the second cam segment are spaced radially farther from the rotational axis than the first force applying surfaces 80b of the first cam segment. The tabs 80e and 80f of the cam releasing plate 80 extend perpendicularly from the main plane of the cam releasing plate 80. The tabs 80e and 80f of the cam releasing plate 80 are configured and arranged to allow a limited amount of rotational play between the shift positioning plate 72 and the cam releasing plate 80. However, once the tab 80e or 80f engages the shift positioning plate 72, the shift positioning plate 72 and the cam releasing plate 80 then generally move together about the main shift axis. This limited amount of rotational play between the shift positioning plate 72 and the cam releasing plate 80 allows the first and second force applying surfaces 80b and 80c of the cam releasing plate 80 to overlap with the first and second recesses 72b and 72c of the shift positioning plate 72, respectively. In other words, limited rotational movement between the shift positioning plate 72 and the cam releasing plate 80 causes one of the first and second force applying surfaces 80b and 80c of the cam releasing plate 80 to contact the detent pin 73b of the detent member 73 and push the detent pin 73b of the detent member 73 out of one of the first and second recesses 72b and 72c of the shift positioning plate 72 as seen in FIG. 9-14.

The position release pawl 81 is pivotally secured to the secondary operating lever 58 to selectively engage the ratchet teeth 80d of the cam releasing plate 80. When the secondary operating lever 58 is in the normal rest position, the position release pawl 81 rests on the release pawl disengagement tab 70d so that the position release pawl 81 is maintained out of engagement with the ratchet teeth 80d of the cam releasing plate 80. However, when the rider pushes the secondary operating lever 58 from the normal rest position in a wire unwinding direction, the release pawl biasing member 83 biases the position release pawl 81 to engage one of the ratchet teeth 80d of the cam releasing plate 80. Further movement of the secondary operating lever 58 causes the cam releasing plate 80 to rotate such that the tab 80e of the cam releasing plate 80 contacts the shift positioning plate 72. At this point, this limited rotational movement between the shift positioning plate 72 and the cam releasing plate 80 causes one of the first and second force applying surfaces 80b and 80c of the cam releasing plate 80 to contact the detent pin 73b of the detent member 73 and push the detent pin 73b of the detent member 73 out of one of the first and second recesses 72b and 72c of the shift positioning plate 72. This movement of the detent pin 73b of the detent member 73 out of one of the first and second recesses 72b and 72c of the shift positioning plate 72 causes the cam arm 73c of the detent member 73 move against the biasing force applied by the position retaining ball 74 and the compression spring 75. This pivotal movement of the detent member 73 causes the cam arm 73c to ride along the position retaining ball 74 such that the force of the position retaining ball 74 and the compression spring 75 on the cam arm 73c switches from one of the cam surfaces of the cam arm 73c to the other of the cam surfaces of the cam arm 73c. Accordingly, the detent member 73 is forcibly moved from one shift position to the next shift position as seen in FIGS. 9-14. This arrangement allows the main operating lever 41 and the secondary operating lever 58 to be operated in a unwire winding direction to shift at least two adjacent ones of the predetermined shift positions in a single continuous shift operation. In the illustrated embodiment, the main operating lever 41 preferably has a range of movement that allows the rider to shift only one shift position at a time in the wire unwinding (release) direction. The secondary operating lever 58 preferably has a range of movement that allows the rider to selectively shift one, two and three shift position in a single continuous shift operation. In other words, the shift positioning plate 72 and the cam releasing plate 80 are configured and arranged to move together such that the detent member 73 toggles between adjacent ones of the first and second recesses 72b and 72c of the shift positioning plate 72 to allow the rider to shift one, two or three shift positions in a single continuous shift operation depending on the movement of the operating lever 41 or 58.

The shift position winding mechanism 66 basically includes the ratchet teeth 72d of the shift positioning plate 72, a position winding pawl 91, a winding pawl mounting pin 92, a winding pawl biasing member 93 and a retaining clip 94. The position winding pawl 91 is pivotally secured to attachment member 42 of the main operating member 37 by the winding pawl mounting pin 92 and the retaining clip 94. The winding pawl biasing member 93 is a torsion spring that biases the position winding pawl 91 to selectively engage the ratchet teeth 72d of the shift positioning plate 72.

When the main operating lever 41 is in the normal rest position, the position winding pawl 91 rests on the winding pawl disengagement tab 70e so that the position winding pawl 91 is maintained out of engagement with the ratchet teeth 72d of the shift positioning plate 72. However, when the rider pushes the main operating lever 41 from the normal rest position in a wire winding direction, the winding pawl biasing member 93 biases the position winding pawl 91 to engage one of the ratchet teeth 72d of the shift positioning plate 72 and one of the ratchet teeth 80g of the cam releasing plate 80. Further movement of the main operating lever 41 causes the shift positioning plate 72 and the cam releasing plate 80 to rotate together. At this point, the shift positioning plate 72 and the cam releasing plate 80 rotate together such that the detent pin 73b of the detent member 73 rides out of one of the first and second recesses 72b and 72c of the shift positioning plate 72 along one of the guide surfaces 72e or 72f of the shift positioning plate 72. This movement of the detent pin 73b of the detent member 73 out of one of the first and second recesses 72b and 72c of the shift positioning plate 72 causes the cam arm 73c of the detent member 73 to move against the biasing force applied by the position retaining ball 74 and the compression spring 75. This pivotal movement of the detent member 73 causes the cam arm 73c to ride along the position retaining ball 74 such that the biasing force of the position retaining ball 74 and the compression spring 75 switches from one of the cam surfaces at the free end of the cam arm 73c to the other of the cam surfaces of the cam arm 73c. Accordingly, the detent member 73 is forcibly moved from one shift position to the next shift position as seen in FIGS. 15-19. This arrangement allows the main operating lever 41 to be operated in a wire winding direction to shift at least two (preferably three) adjacent ones of the predetermined shift positions in a single continuous shift operation. In other words, the shift positioning plate 72 and the cam releasing plate 80 are configured and arranged to move together such that the detent member 73 toggles between adjacent ones of the first and second recesses 72b and 72c of the shift positioning plate 72 to allow the rider to shift one, two or three shift positions in a single continuous shift operation depending on the movement of the main operating lever 41.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A position control mechanism for a bicycle control device comprising:
    a positioning member and rotatably arranged to rotate about a rotational axis between a plurality of predetermined shift positions;
    a position maintaining member movably arranged to selectively move from a first engagement position to a second engagement position, the position maintaining member contacting and holding the positioning member in one of the predetermined shift positions of the positioning member when the position maintaining member is in the first engagement position, and the position maintaining member contacting and holding the positioning member in another of the predetermined shift positions when the position maintaining member is in the second engagement position,
    the second engagement position being different from the first engagement position with respect to the positioning member such that an orientation of the position maintaining member changes with respect to the positioning member when the position maintaining member is moved from the first engagement position to the second engagement position; and
    a releasing member operatively coupled to the position maintaining member to move the position maintaining member between the first and second engagement positions.

2. The position control mechanism according to claim 1, further comprising
    an operating lever configured and arranged to move the releasing member.

3. The position control mechanism according to claim 2, wherein
    the operating lever is a separate member from the releasing member.

4. The position control mechanism according to claim 1, wherein
    the positioning member includes a first toothed segment with a plurality of first recesses defining a first set of the shift positions and a second toothed segment with a plurality of second recesses defining a second set of the shift positions with the position maintaining member being a detent member that is configured and arranged to alternately move between the first and second recesses.

5. The position control mechanism according to claim 1, further comprising
    a wire take up member coupled to move with the positioning member, and arranged to pull and release a cable wire in response to rotation of the positioning member about the rotational axis.

6. A position control mechanism for a bicycle control device comprising:
    a positioning member rotatably arranged to rotate about a rotational axis between a plurality of predetermined shift positions;
    a position maintaining member movably arranged to selectively move from a first engagement position to a second engagement position, the position maintaining member contacting and holding the positioning member in one of the predetermined shift positions of the positioning member when the position maintaining member is in the first engagement position, and the position maintaining member contacting and holding the positioning member in another of the predetermined shift positions when the position maintaining member is in the second engagement position, the second engagement position being different from the first engagement position; and a releasing member operatively coupled to the position maintaining member to move the position maintaining member between the first and second engagement positions such that the releasing member causes a wire release in an unwinding direction, the releasing member being configured and arranged to move the position maintaining member such that the positioning member rotates through at least two adjacent ones of the predetermined shift positions in a single shift operation.

7. A position control mechanism for a bicycle control device comprising:

a positioning member configured and arranged to rotate about a rotational axis between a plurality of predetermined shift positions;

a position maintaining member movably arranged to selectively move from a first engagement position to a second engagement position, the position maintaining member contacting and holding the positioning member in one of the predetermined shift positions of the positioning member when the position maintaining member is in the first engagement position, and the position maintaining member contacting and holding the positioning member in another of the predetermined shift positions when the position maintaining member is in the second engagement position, the second engagement position being different from the first engagement position; and a releasing member operatively coupled to the position maintaining member to move the position maintaining member between the first and second engagement positions such that the releasing member causes a wire release in an unwinding direction, the releasing member including a plurality of force applying surfaces configured and arranged to selectively contact the position maintaining member, the force applying surfaces having a first surface that contacts the position maintaining member when the position maintaining member is in the first engagement position, and a second surface which is different from the first surface and that contacts the position maintaining member when the position maintaining member is in the second engagement position, the first and second surfaces contacting the position maintaining member separately.

8. The position control mechanism according to claim 7, wherein the force applying surfaces are formed as a slot in the releasing member.

9. A position control mechanism for a bicycle control device comprising:

a positioning member configured and arranged to rotate about a rotational axis between a plurality of predetermined shift positions;

a position maintaining member movably arranged to selectively move from a first engagement position to a second engagement position, the position maintaining member contacting and holding the positioning member in one of the predetermined shift positions of the positioning member when the position maintaining member is in the first engagement position, and the position maintaining member contacting and holding the positioning member in another of the predetermined shift positions when the position maintaining member is in the second engagement position, the second engagement position being different from the first engagement position; and a releasing member operatively coupled to the position maintaining member to move the position maintaining member between the first and second engagement positions such that the releasing member causes a wire release in an unwinding direction, the positioning member including a first toothed segment with a plurality of first recesses defining a first set of the shift positions and a second toothed segment with a plurality of second recesses defining a second set of the shift positions with the position maintaining member being a detent member that is configured and arranged to alternately move between the first and second recesses, the positioning member being a plate with the second toothed segment spaced radially farther from the rotational axis than the first toothed segment.

10. A position control mechanism for a bicycle control device comprising:

a positioning member configured and arranged to rotate about a rotational axis between a plurality of predetermined shift positions;

a position maintaining member movably arranged to selectively move from a first engagement position to a second engagement position, the position maintaining member contacting and holding the positioning member in one of the predetermined shift positions of the positioning member when the position maintaining member is in the first engagement position, and the position maintaining member contacting and holding the positioning member in another of the predetermined shift positions when the position maintaining member is in the second engagement position, the second engagement position being different from the first engagement position; and a releasing member operatively coupled to the position maintaining member to move the position maintaining member between the first and second engagement positions such that the releasing member causes a wire release in an unwinding direction, the position maintaining member being selectively biased in a first direction when in the first engagement position and biased in a second direction when in the second engagement position, the first and second directions being different directions.

11. A position control mechanism for a bicycle control device comprising:

a positioning member configured and arranged to rotate about a rotational axis between a plurality of predetermined shift positions;

a position maintaining member movably arranged to selectively move from a first engagement position to a second engagement position, the position maintaining member contacting and holding the positioning member in one of the predetermined shift positions of the positioning member when the position maintaining member is in the first engagement position, and the position maintaining member contacting and holding the positioning member in another of the predetermined shift positions when the position maintaining member is in the second engagement position, the second engagement position being different from the first engagement position; and a releasing member operatively coupled to the position maintaining member to move the position maintaining member between the first and second engagement positions such that the releasing member causes a wire release in an unwinding direction, the positioning member including a plurality of ratchet teeth configured and arranged to be engaged by a first pawl to rotate in a first rotational direction about the rotational axis, and the releasing member including a plurality of ratchet teeth configured and arranged to be engaged by a second pawl to rotate in a second rotational direction about the rotational axis that is opposite to the first direction.

12. A position control mechanism for a bicycle control device wherein comprising:

a positioning member configured and arranged to rotate about a rotational axis between a plurality of predetermined shift positions;

a position maintaining member movably arranged to selectively move from a first engagement position to a second engagement position, the position maintaining member contacting and holding the positioning member in one of the predetermined shift positions of the positioning member when the position maintaining member is in the first engagement position, and the position maintaining member contacting and holding the positioning member in another of the predetermined shift positions when the position maintaining member is in the second engagement position, the second engagement position being different from the first engagement position; and a releasing member operatively coupled to the position maintaining member to move the position maintaining member between the first and second engagement positions such that the releasing member causes a wire release in an unwinding direction, the positioning member having a first toothed segment and a second toothed segment spaced radially farther from the rotational axis than the first toothed segment, and the position maintaining member engaging a tooth of the first toothed segment in a first engagement position and the position maintaining member engaging a tooth of the second toothed segment in a second engagement position to selectively maintain the positioning member in one of the predetermined shift positions.

13. The position control mechanism according to claim 12, wherein the first toothed segment includes a plurality of first recesses defining a first set of the shift positions and the second toothed segment with a plurality of second recesses defining a second set of the shift positions with the position maintaining member being a detent member that is configured and arranged to alternately move between the first and second recesses.

14. The position control mechanism according to claim 13, wherein the releasing member includes a plurality of first force applying surfaces configured and arranged to selectively contact the position maintaining member to move the detent member out of the first recesses, respectively, and a plurality of second force applying surfaces configured and arranged to selectively contact the position maintaining member to move the detent member out of the second recesses, respectively, in response to movement of the releasing member relative to the positioning member.

15. The position control mechanism according to claim 12, wherein the position maintaining member is selectively biased in a first direction when in the first engagement position and biased in a second direction when in the second engagement position.

16. The position control mechanism according to claim 12, wherein the positioning member includes a plurality of ratchet teeth configured and arranged to be engaged by a first pawl to rotate in a first rotational direction about the rotational axis, and the releasing member includes a plurality of ratchet teeth configured and arranged to be engaged by a second pawl to rotate in a second rotational direction about the rotational axis that is opposite to the first direction.

17. The position control mechanism according to claim 12, further comprising a wire take up member coupled to move with the positioning member, and arranged to pull and release a cable wire in response to rotation of the positioning member about the rotational axis.

* * * * *